United States Patent
Sugano

(10) Patent No.: US 7,658,128 B2
(45) Date of Patent: Feb. 9, 2010

(54) TRANSMISSION HOUSING STRUCTURE FOR FOUR WHEEL DRIVE SYSTEM

(75) Inventor: Taku Sugano, Shizuoka (JP)

(73) Assignee: Jatco Ltd., Fuji-shi (JP)

( * ) Notice: Subject to any disclaimer, the term of this patent is extended or adjusted under 35 U.S.C. 154(b) by 365 days.

(21) Appl. No.: 11/580,056

(22) Filed: Oct. 13, 2006

(65) Prior Publication Data
US 2007/0155572 A1 Jul. 5, 2007

(30) Foreign Application Priority Data
Oct. 14, 2005 (JP) .............................. 2005-299857

(51) Int. Cl.
*F16H 57/04* (2006.01)
(52) U.S. Cl. .................................. 74/606 R
(58) Field of Classification Search ............... 74/606 R, 74/606 A; 475/200, 206; 180/344, 346; 277/641, 598, 591
See application file for complete search history.

(56) References Cited

U.S. PATENT DOCUMENTS

| | | | | |
|---|---|---|---|---|
| 4,738,152 A | * | 4/1988 | Takimura et al. ............... | 74/467 |
| 4,995,971 A | * | 2/1991 | Droste et al. ............ | 210/167.03 |
| 5,042,321 A | * | 8/1991 | Hongo et al. ............. | 74/606 R |
| 5,042,610 A | * | 8/1991 | Shiraishi et al. ............. | 180/249 |
| 5,123,298 A | * | 6/1992 | Taguchi ..................... | 74/606 R |
| 5,743,156 A | * | 4/1998 | Watanabe et al. .......... | 74/606 R |
| 5,832,789 A | * | 11/1998 | Kinto et al. ................ | 74/606 R |
| 6,158,303 A | * | 12/2000 | Shiraishi et al. ............. | 74/665 T |
| 6,871,626 B2 | * | 3/2005 | Kamiyama et al. ....... | 123/195 C |
| 7,004,636 B2 | | 2/2006 | Deschler | |
| 7,493,999 B2 | * | 2/2009 | Reed et al. ................ | 192/219.5 |
| 2003/0136219 A1 | * | 7/2003 | Gotou et al. .............. | 74/606 R |

FOREIGN PATENT DOCUMENTS

| | | |
|---|---|---|
| JP | 2001-146956 A | 5/2001 |
| WO | WO 02/25124 A2 | 3/2002 |

\* cited by examiner

*Primary Examiner*—David D Le
*Assistant Examiner*—Justin Holmes
(74) *Attorney, Agent, or Firm*—Foley & Lardner LLP

(57) ABSTRACT

A four wheel drive transmission housing includes a transmission housing member, and a converter housing member including an engine mount portion on a first side of the converter housing; a transfer mount portion defining a first side joint surface on the first side; and a transmission housing mount portion defining a second side joint surface on a second side of the converter housing member. First and second reinforcing ribs are formed between the first side joint surface and the second side joint surface. The first reinforcing rib extends in a vertically extending first direction, from a rib connecting portion. The second reinforcing rib extends in a horizontally extending second direction from the rib connecting portion. The first and second reinforcing ribs are provided so as to surround a drive shaft to transmit driving power from the transmission mechanism to the transfer.

20 Claims, 9 Drawing Sheets

TRANSMISSION HOUSING STRUCTURE FOR FOUR WHEEL DRIVE SYSTEM

BACKGROUND OF THE INVENTION

The present invention relates to a transmission system for four wheel drive, and more specifically to a transmission housing structure.

A published Japanese patent application No. 2001-146956 shows a bearing housing, such as transmission housing and differential carrier housing, formed with reinforcing ribs extending radially around a bearing portion for supporting a rotating shaft, to increase the rigidity with a smaller amount of material, and thereby to prevent deterioration of gear meshing due to deformation of the housing, and energy loss due to friction increase. A published international application WO 02/2514124 A2 (≈ Publication of Japanese language translation Pub. No. 2004-509298) shows a bearing housing having another rib structure.

SUMMARY OF THE INVENTION

In a transmission for a four wheel drive, a transfer is connected with the transmission. Specifically when a transfer is connected with a converter housing of the transmission, the converter housing receives a load due to a load applied on the transfer at the joint portion. The load applied on the transfer includes the weight of the transfer (static load) and a reaction force of torque (dynamic load) inputted from a rotating shaft extending from the transfer.

The load applied on the converter housing from the transfer is not always symmetrical or uniform around the axis of a shaft from a differential to the transfer, so that a rib structure of radial ribs extending radially around the axis is not always satisfactory. From the transfer, the load is transmitted in a concentrated manner to the joint portion of the converter housing with the transfer.

Therefore, tensile stress or compression stress is concentrated at the joint portion, and the joint portion tends to be insufficient in rigidity. Consequently, the transmission housing might cause deterioration of gear engagement, generation of noise and heat, nonuniform wearing of a shaft bearing, and deterioration in torque transmission due to friction loss.

It is therefore an object of the present invention to provide a transmission housing having an increased rigidity to withstand a load applied from a transfer.

According to one aspect of the present invention, a transmission housing for a four wheel drive system, comprises: a transmission housing member to enclose a transmission mechanism; a transfer housing member to enclose a transfer to apportion a driving torque from the transmission mechanism between front wheel's side and rear wheel's side; and a converter housing member to enclose a torque converter to be connected between an engine and the transmission mechanism. The converter housing member includes: an engine mount portion on a first side of the converter housing; a transfer mount portion defining a first side joint surface on the first side; a transmission housing mount portion including a flange and defining a second side joint surface on a second side of the converter housing member opposite to the first side; and first and second reinforcing ribs formed between the first side joint surface and the second side joint surface. The first reinforcing rib extends in a vertically extending first direction, from a rib connecting portion formed at a position contacting with an inner circumference of the flange of the transmission housing mount portion. The second reinforcing rib extends in a horizontally extending second direction from the rib connecting portion. The first and second reinforcing ribs are provided so as to surround a drive shaft to transmit driving power from the transmission mechanism to the transfer.

DETAILED DESCRIPTION OF THE INVENTION

Figure 1:
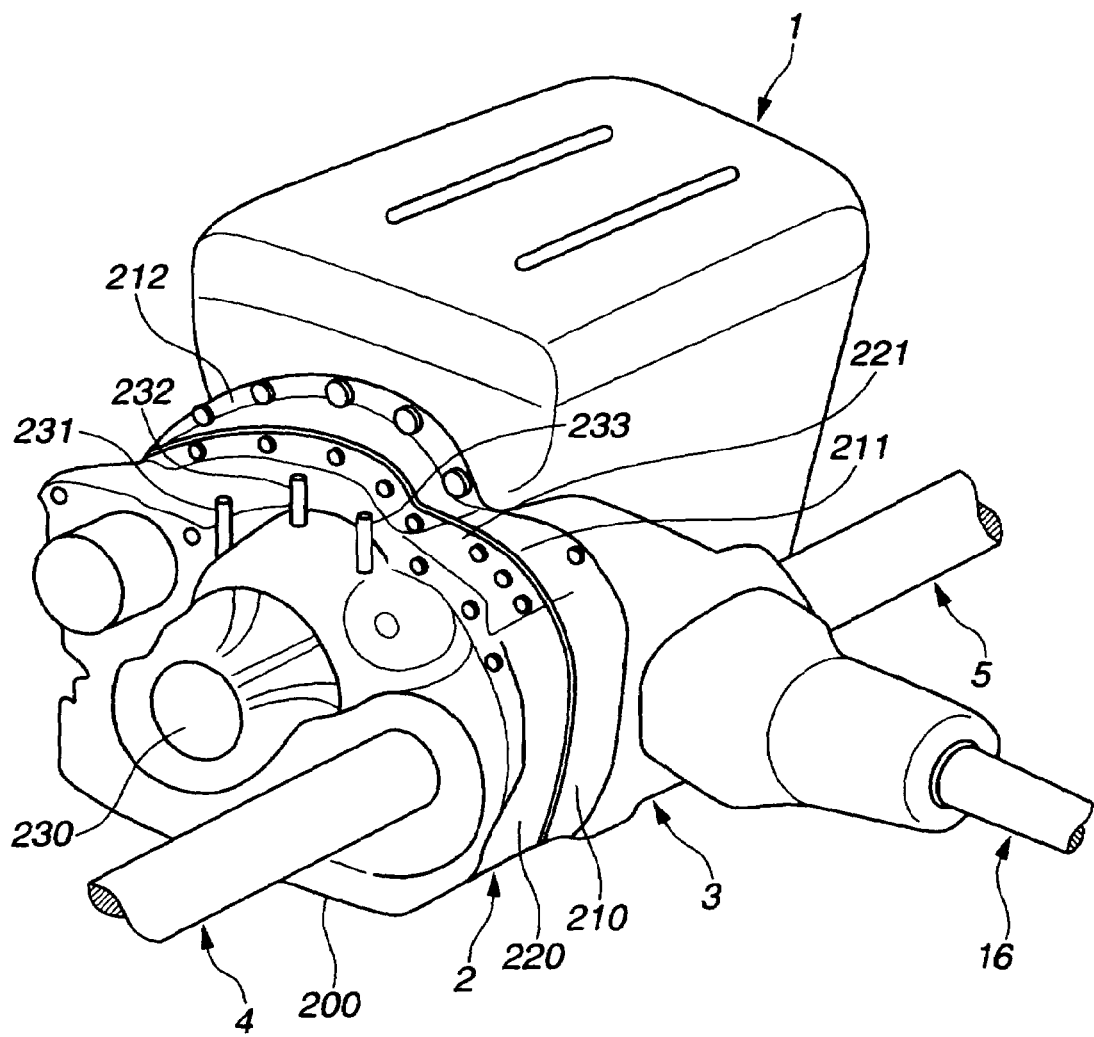
FIG. 1 is a schematic perspective view showing a four wheel drive transmission system including a transmission housing according to one embodiment of the present invention.

FIG. 1 shows, in perspective, a power transmission system or transmission assembly for a four wheel drive system, provided with a transmission housing according to one embodiment of the present invention. In FIG. 1, various directions are defined in the following manner. A propeller shaft 16 extends in a front-and-rear direction, and left and right front wheel drive shafts 4 and 5 extend in a lateral (or left-and-right) direction. An engine I is located on a front side, and the propeller shaft 16 extends rearwards. Left front wheel drive shaft 4 extends leftwards, and right front wheel drive shaft 5 extends rightwards. A vertical direction is perpendicular to an imaginary horizontal plane to which each of the lateral direction and the front-and-rear direction is parallel.

This power transmission system includes the engine 1, an automatic transmission 2 and a transfer 3. Engine 1 and transfer 3 are joined to the right side of automatic transmission 2. Engine 1 is located on the front side of transfer 3, and joined to a front portion of automatic transmission 2. Transfer 3 is located on the rear side of engine 1, and joined to a rear portion of automatic transmission 2. Left front wheel drive shaft 4 extends leftwards from a left side hole formed in automatic transmission 2 toward a left front wheel of the vehicle, and right front wheel drive shaft 5 extends rightwards from a right side hole formed in transfer 3, toward a right front wheel. Propeller shaft 6 extends rearwards from a rear side hole formed in transfer 3.

A transmission housing 200 is a housing of automatic transmission 2. Transmission housing 200 includes a converter housing member 210, and a transmission housing member which, in this example, is composed of first and second housing members 220 and 230.

A left side flange 211 of converter housing member 210 and a right side flange 221 of first housing member 220 are joined together (by a plurality of bolts extending in the lateral direction). Second housing member 230 is joined to the left side of first housing member 220. Engine 1 and transfer 3 are joined to the right side of converter housing member 210. From the upper surface of second housing member 230, bolts 231, 232 and 233 extend upwards to fix the transmission housing 200 to a vehicle body.

Figure 2:
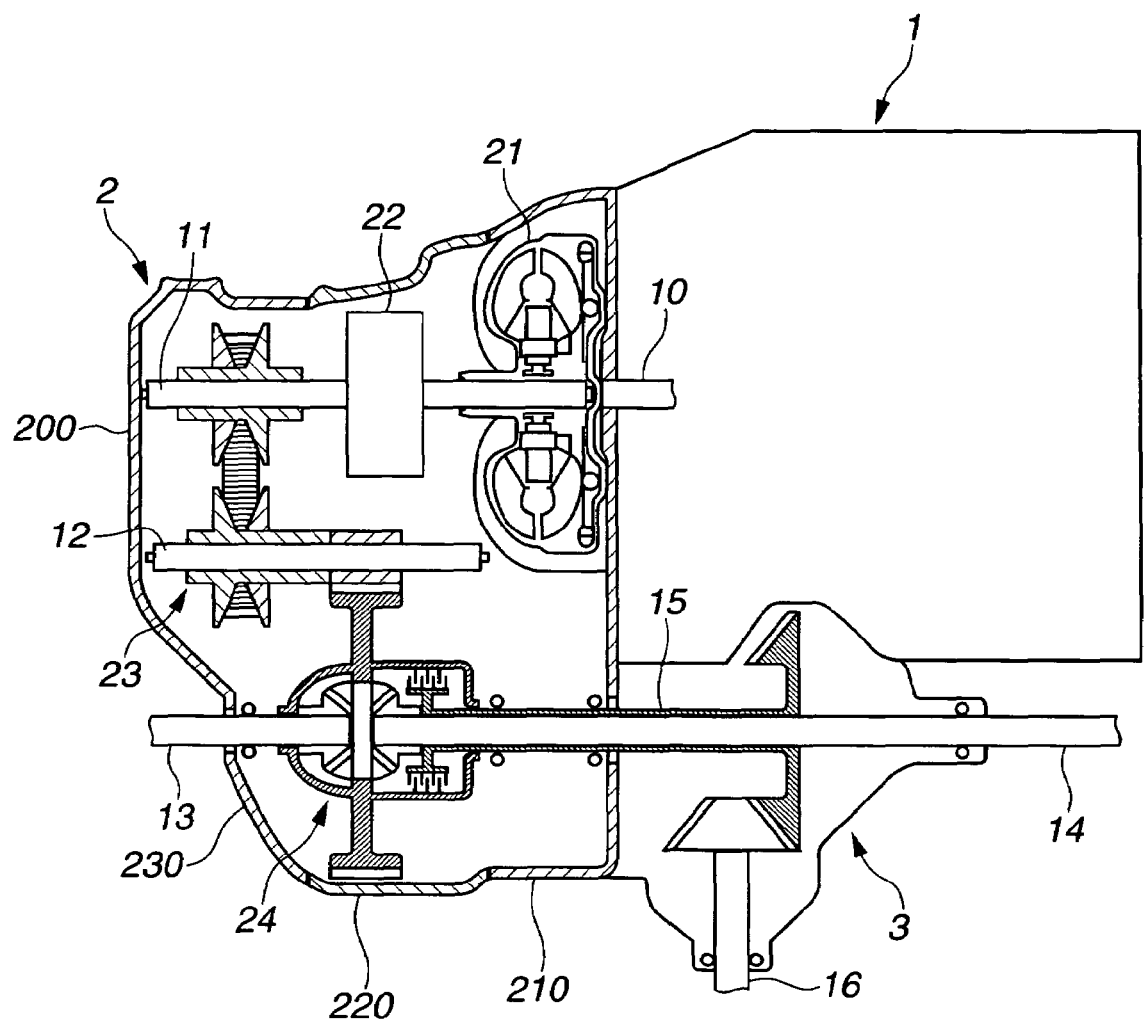
FIG. 2 is a sectional view showing an automatic transmission mechanism and a transfer enclosed by the transmission housing of FIG. 1.

As shown in FIG. 2, transmission housing 200 encloses a transmission mechanism of the automatic transmission and a torque converter 21. The transmission mechanism of this example includes a forward-reverse changeover mechanism 22 including a start clutch, a belt type continuously variable transmission unit 23 capable of varying a speed ratio between input rotation and output rotation continuously, and a differential gear unit 24.

Torque converter 21 is connected between an engine output shaft 10 and a transmission input shaft 11. Torque converter 21 multiplies torque outputted from engine 1, and transmit torque to forward-reverse changeover mechanism 22.

Belt type continuously variable transmission 23 receives rotation through forward-reverse changeover mechanism 22 and transmission input shaft 11, and transmits the rotation to a transmission output shaft 12. The rotation of transmission output shaft 12 is further transmitted to differential gear unit 24 and rear wheel drive shaft 15.

Differential gear unit 24 is connected with left and right front wheel drive shafts 13 and 14, and arranged to divide the torque inputted from transmission output shaft 12 between left and right front wheel drive shafts 13 and 14.

Rear wheel drive shaft 15 extends rightwards into transfer 3, and transmits the rotation inputted from transmission output shaft 12 to propeller shaft 16. Transfer 3 is contained in a transfer housing formed by a transfer housing member. The transfer housing member encloses a right portion of rear wheel drive shaft 15 and a gearing which drivingly connects the rear wheel drive shaft 15 to propeller shaft 16. It is possible to employ one of various known types of the transfer.

Figure 3:
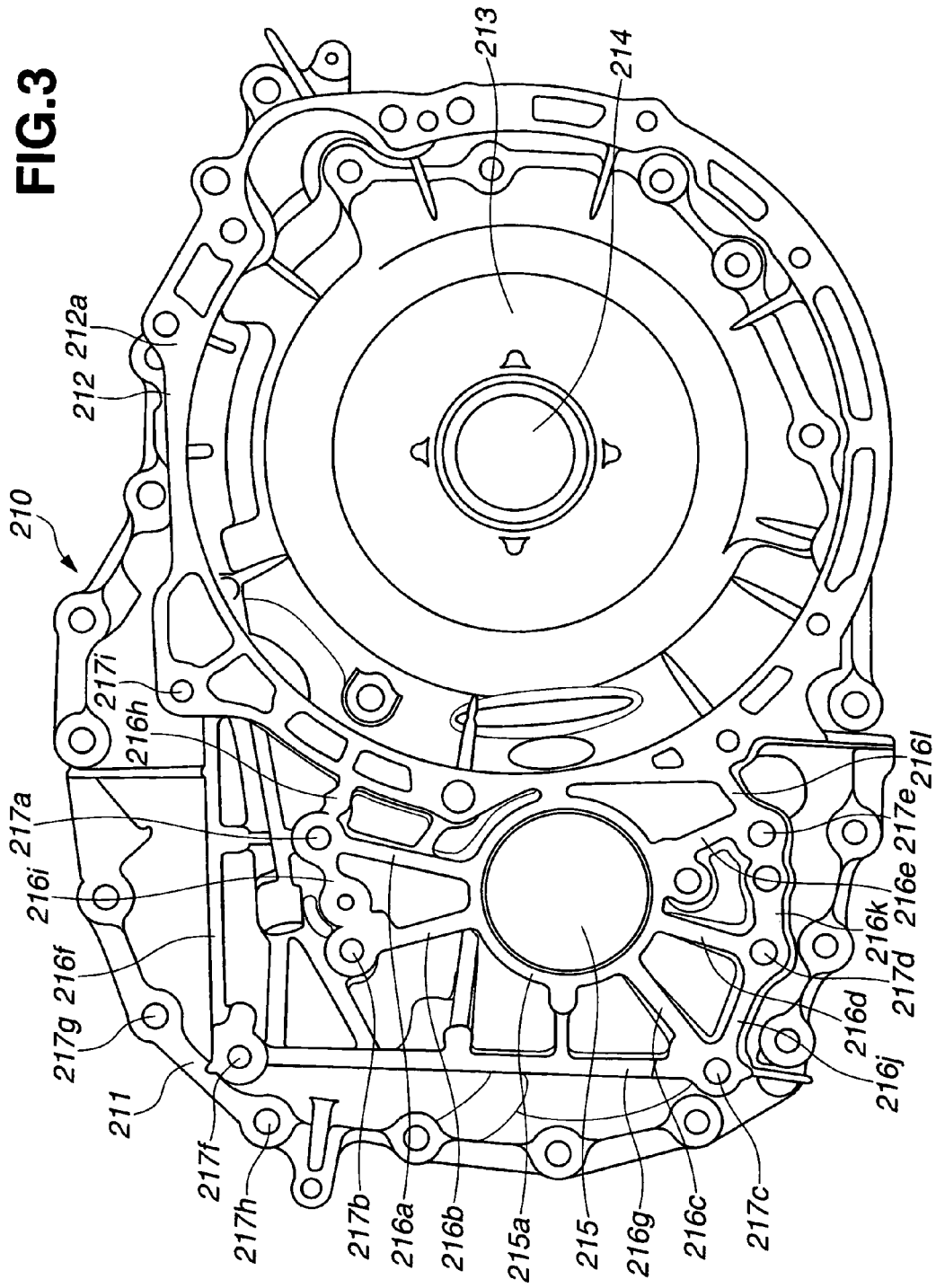
FIG. 3 is a front view showing a converter housing member of the transmission housing of FIG. 1 as viewed from an engine's side.
Figure 4:
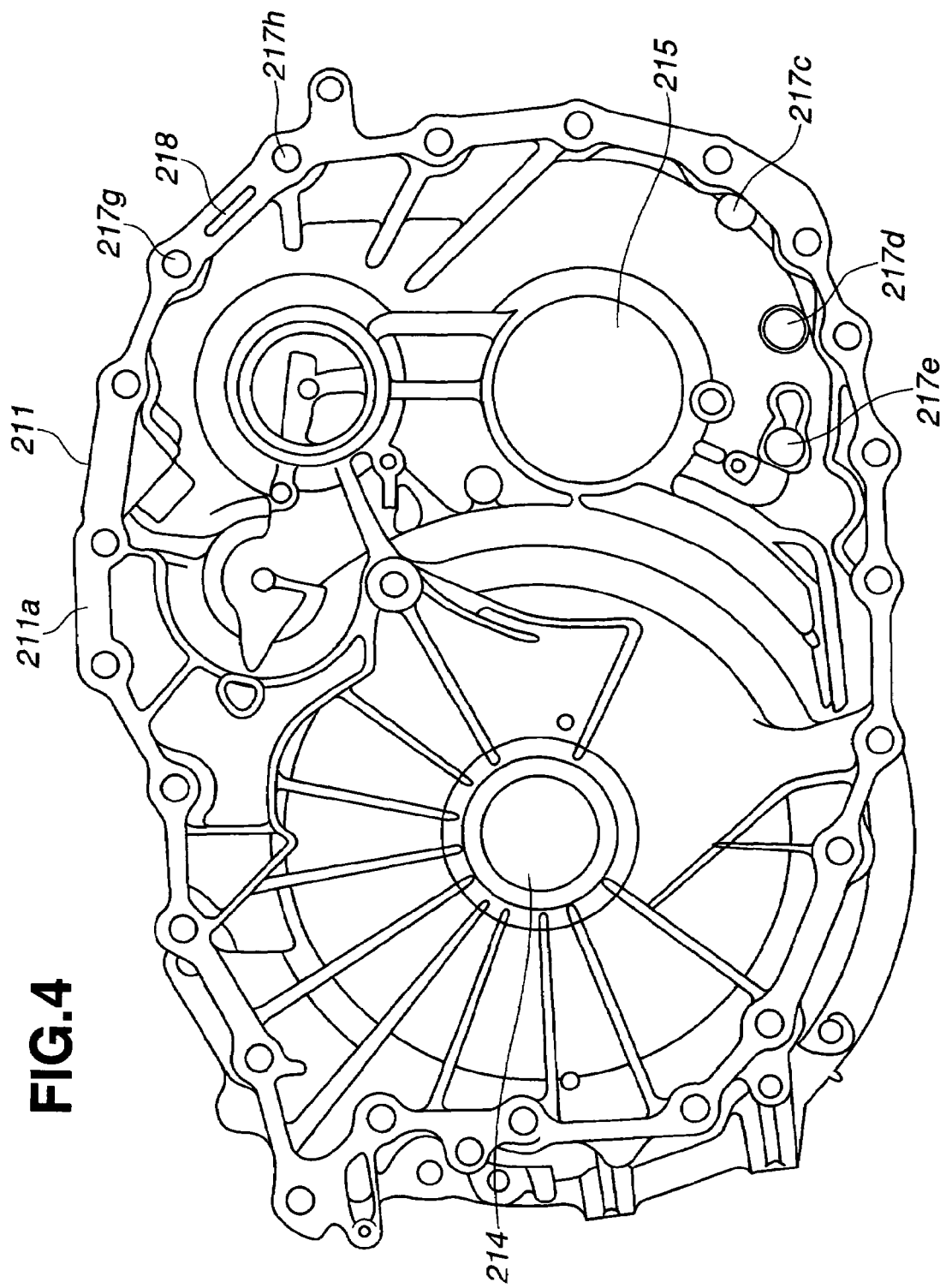
FIG. 4 is a front view showing the converter housing member of FIG. 3, as viewed from the opposite side or first housing's side.

FIG. 3 shows the right side (or a first side) of converter housing member 210 as viewed from the engine's side. Converter housing member 210 includes a transmission housing mount portion which, in this example, is in the form of the left side flange 211 to which the right side flange 221 of first housing member 220 is joined. Flange 211 extends so as to form an outer circumference of the left side (or the transmission housing's side or a second side) of converter housing member 210, as best shown in FIG. 4. Flange 211 has a flange surface or joint surface 211a.

Converter housing member 210 further includes a depression 213 to receive torque converter 21. Depression 213 is depressed from the engine's side (or the first side) of converter housing member 210. Depression 213 is approximately cylindrical. At the center of depression 213, there is formed a center opening 214 to receive the transmission input shaft 11. Converter housing member 210 further includes an engine mount portion in the form of a flange 212 for fixing the converter housing member 210 to engine 1. Flange 212 surrounds the depression 213, and has a joint surface or flange surface 212a which, in this example, encircles the depression 213.

Converter housing member 210 further includes a drive shaft boss portion 215a defining a shaft hole 215 to receive right front drive shaft 14 and rear wheel drive shaft 15. From the drive shaft boss portion, radial ribs 216a~216e extend radially outwards to respective outer ends. The outer ends of radial ribs 216a~216e are connected, respectively, with bolt boss portions formed, respectively, with bolt holes 217a~217e each to receive one of bolts for fixing the transfer 3 to converter housing member 210.

A connecting rib 216i connects the bolt boss portions of bolt holes 217a and 217b. A connecting rib 216j connects the bolt boss portions of bolt holes 217c and 217d. A connecting rib 216k connects the bolt boss portions of bolt holes 217d and 217e. A connecting rib 216h connects the bolt boss portion of bolt hole 217a with the flange 212. A connecting rib 216i connects the bolt boss portion of bolt hole 217e with the flange 212.

In this example, the drive shaft boss portion 215a for shaft hole 215, the radial ribs 216a~216e, the bolt boss portions for bolt holes 216a~216e, the connecting ribs 216h~216i, and a bolt boss portion of a bolt hole 217f constitute a transfer mount portion defining a joint surface to which the housing of transfer 3 is joined by bolts.

The bolt boss portions for bolt holes 217c, 217d and 217e, and the connecting ribs 216j, 216k and 216i form a lower mount portion of the transfer mount portion. The bolt boss portions for bolt holes 217a and 217b and the connecting ribs 216h and 216i form an upper mount portion of the transfer mount portion. The drive shaft boss portion 215a is formed vertically between the lower mount portion of the transfer mount portion on the lower side, and the upper mount portion on the upper side.

Two reinforcing ribs 216g and 216f extends, respectively, in first and second directions from the boss portion of bolt hole 217f. The bolt boss portion for bolt hole 217a serves as a rib connecting portion. In this example, reinforcing ribs 216g and 216f extend straight in the first and second directions, respectively. Reinforcing rib 216g extends vertically from the (upper) bolt boss portion for bolt hole 217f, to the (lower) bolt boss portion for bolt hole 217c. The first direction in which reinforcing rib 216g extends is approximately vertical. Reinforcing rib 216f extends horizontally (approximately in the front and rear direction) from the bolt boss portion for bolt hole 217f, to the flange 212 at a portion near a bolt hole 217i formed in flange 212, as shown in FIG. 3.

FIG. 4 shows the left side of converter housing member 210 as viewed from the first housing member's side. The flange joint surface 211a of flange 211 is a flat surface to be joined with the flat joint surface 221a of flange 221 of first housing member 220. The flat flange joint surface 211a is a relatively narrow surface extending around the holes 214 and 215 and forming the outer circumference of converter housing member 210 on the left side. A groove 218 is formed in the flange joint surface 211a. The flange 211 includes a bolt boss portion formed with a bolt hole 217g opening in the flange surface 211a, a bolt boss portion formed with a bolt hole 217h opening in the flange surface 211a, and a flange portion connecting the boss portions for bolt holt holes 217g and 217h. Groove 218 is formed in this flange portion extending between bolt holes 217g and 217h. On the right side (or transfer's side) of converter housing member 210 as shown in FIG. 3, the boss portion for bolt hole 217f serving as the rib connecting portion is connected with the flange portion formed with groove 218. On the right side of converter housing member 210, the boss portion for bolt hole 217f is contact with the inner side of the connecting flange portion formed, on the left side, with groove 218.

Figure 5:
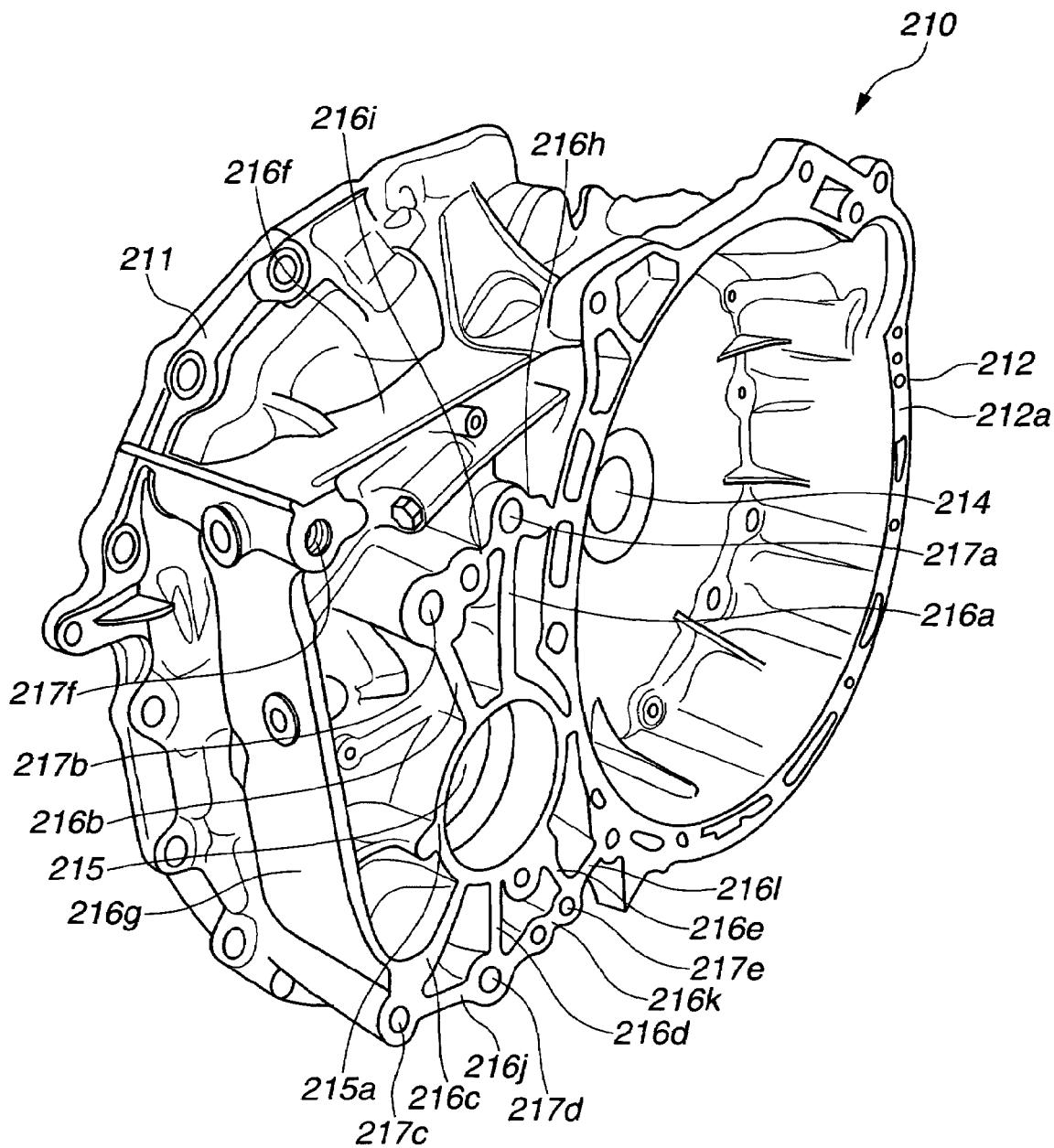
FIG. 5 is a perspective view showing the converter housing member of FIG. 3 as viewed from a transfer mounting side.

FIG. 5 shows converter housing member 210 in perspective as viewed from the transfer's (right) side. The joint surface 212a of flange 212 is flush with the joint surface of the transfer mount portion formed by the drive shaft boss portion 215a for shaft hole 215, the radial ribs 216a~216e, the bolt boss portions for bolt holes 216a~216e, the connecting ribs 216h~216i, so that a continuous flat joint surface is formed by the flange joint surface 212a and the joint surface of the transfer mount portion. The reinforcing ribs 216f and 216g extend in the lateral direction between the joint surface of the transfer mount portion on the first (right) side and the flange 211 on the second (left) so that each of the reinforcing ribs 216f and 216g has a predetermined width.

Figure 6:
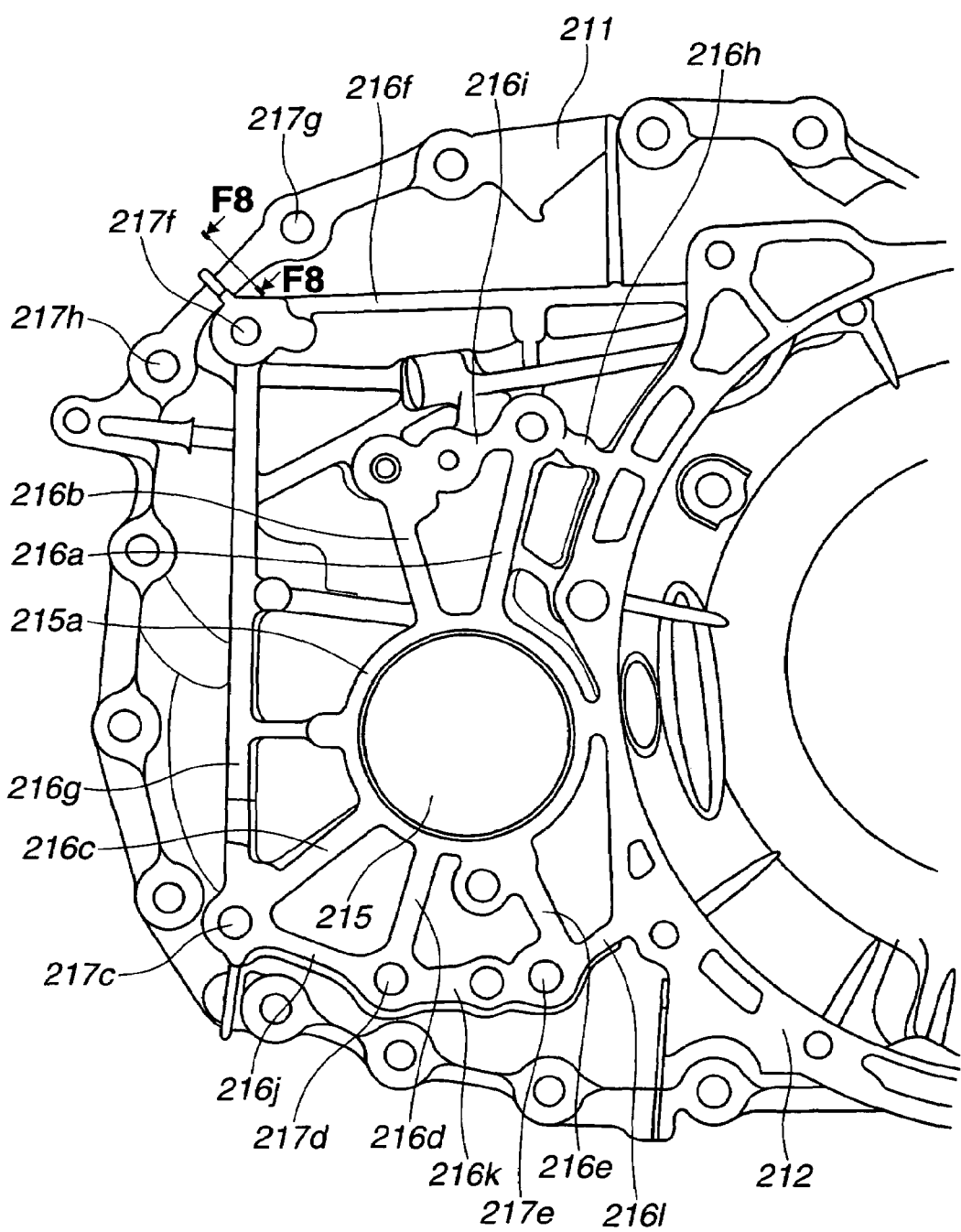
FIG. 6 is an enlarged front view showing a transfer mount portion of the converter housing member of FIG. 3.

FIG. 6 is an enlarged front view showing the transfer mount portion of converter housing member 210 as viewed from the transfer's (right) side.

Vertical reinforcing rib 216g extends vertically in a crescent-shaped region formed between flange 211 and flange 212 so as to maximize the length of vertical reinforcing rib 216g and so as to avoid interference with the drive shaft boss portion 215a of shaft hole 215, the ribs 216a~216e and the ribs 216h~216.

In this example, each of the lower bolt boss portion for bolt hole 217c and the upper bolt boss portion for bolt hole 217f is formed at a position contacting with the inner circumference of flange 211. Vertical reinforcing rib 216g extends straight along a substantially vertical straight line connecting the bolt holes 217c and 217f, from a lower rib end connected with the lower bolt boss portion of bolt hole 217c, to an upper rib end connected with the upper bolt boss portion of bolt hole 217f. In the crescent-shaped region, vertical reinforcing rib 216g extends vertically between the flange 211 located on the rear side of rib 216g, and the drive shaft boss portion 215a located on the front side, and the drive shaft boss portion 215a is located between the vertical reinforcing rib 216g on the rear side of boss portion 215a, and the flange 212 on the front side. The drive shaft boss portion 215a, the radial ribs 216a~216e and the connecting ribs 216h~216i are all located between the vertical reinforcing rib 216g and flange 212 in the crescent-shaped region.

From the bolt boss portion for bolt hole 217f, the horizontal reinforcing rib 216f extends straight along a substantially horizontal straight line which is substantially perpendicular to the straight line along which the vertical reinforcing rib 216g extends. In the crescent-shaped region, the horizontal reinforcing rib 216f extends horizontally from a rear rib end connected with the bolt boss portion for bolt hole 217f, to a front rib end connected with flange 212 at a position near bolt hole 217 shown in FIG. 3, in the direction along the propeller shaft 16. The drive shaft boss portion 215a, the boss portions for bolt holes 217a~217e, the radial ribs 216a~216e and the connecting ribs 216h~2161 are all located below the horizontal reinforcing rib 216f in the crescent-shaped region. The boss portions for bolt holes 217a and 217b are located vertically between the horizontal reinforcing rib 216f and the drive shaft boss portion 215a.

The vertical reinforcing rib 216g and horizontal reinforcing ribs 216f are connected at the boss portion of bolt hole 217f serving as the rib connecting portion, so as to form a corner angled at a right angle. Vertical and horizontal reinforcing ribs 216g and 216f are arranged so as to form an inverted L-shaped wall. In the illustrated example, the length of vertical reinforcing rib 216g is greater than the length of horizontal reinforcing rib 216f.

Figure 7:
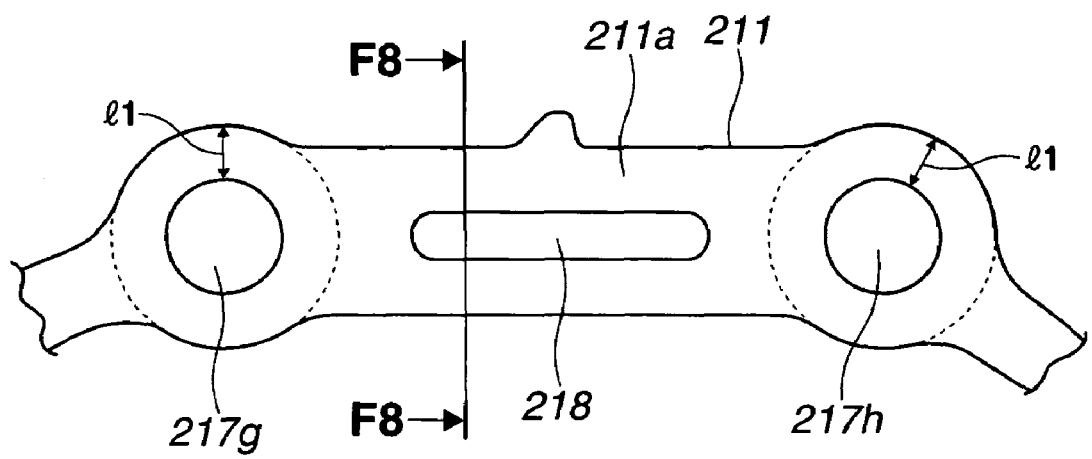
FIG. 7 is an enlarged front view showing a groove formed in a flange of the converter housing member of FIG. 3.

FIG. 7 is an enlarged front view as viewed from the transmission housing's side or the left side of converter housing member 210, showing the boss portions of bolt holes 217g and 217h and the connecting flange portion connecting the boss portions and including the groove 218. Groove 218 extends between the two adjacent bolt holes 217g and 217h along a straight line connecting both bolt holes. Groove 218 is depressed from the joint surface 211a. Between the cylindrical boss portion of bolt hole 217g shown by two concentric circles in FIG. 7 and the cylindrical boss portion of bolt hole 217h shown by two concentric circles, the groove 218 extends with a constant width so as to inscriber a straight line segment extending between the bolt holes 217g and 217h, from a first groove end which is closer to, but separate from, the boss portion of bolt hole 217g, to a second groove end which is closer to, but separate from, the boss portion of bolt hole 217h, as shown in FIG. 7. In this example, the cylindrical boss portions of bolt holes 217g and 217h are identical in size, and the width of the cylindrical boss portions is equal to l1 as shown in FIG. 7.

Figure 8:
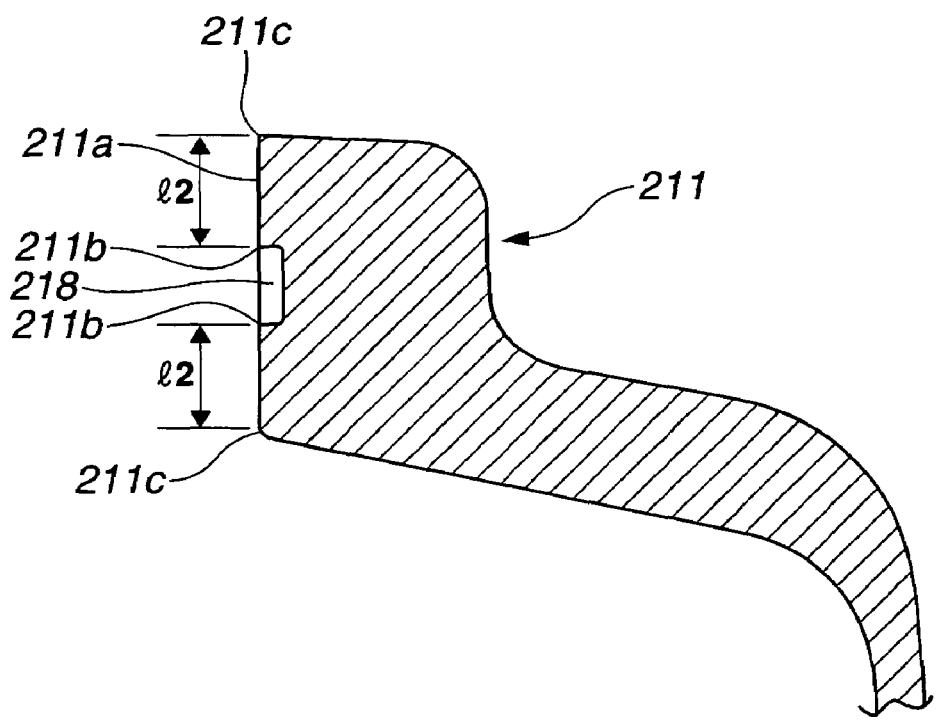
FIG. 8 is a sectional view taken across a line F8-F8 shown in FIGS. 6 and 7.

FIG. 8 is a sectional view of the connecting flange portion, taken across a line F8-F8 shown in FIGS. 6 and 7, as if cut by an imaginary plane to which the straight line connecting the holes 217g and 217h is perpendicular. Groove 218 is depressed from the joint surface 211a so as to form a non-joint region which is spaced from the confronting joint surface 221a of the mating flange 221 of first housing member 220. The non-joint region formed by groove 218 is formed between an outer joint surface region on the upper side as viewed in FIG. 8, and an inner joint surface region on the lower side as viewed in FIG. 8. In this example, groove 218 is formed at the middle of the joint surface 211a. Accordingly, the width of the outer joint surface region between an outer end 211c of the joint surface 211a and an outer end 211b of groove 218 is substantially equal to the width of the inner joint surface region between an inner end 211c of the joint surface 211a and an inner end 211b of groove 218. In FIG. 8, the widths of the outer and inner joint surface regions are both equal to l2. In this example, this width l2 is equal to or slightly greater than the width l1 of the boss portions.

The thus-constructed converter housing is operated in the following manner.

Figure 9:
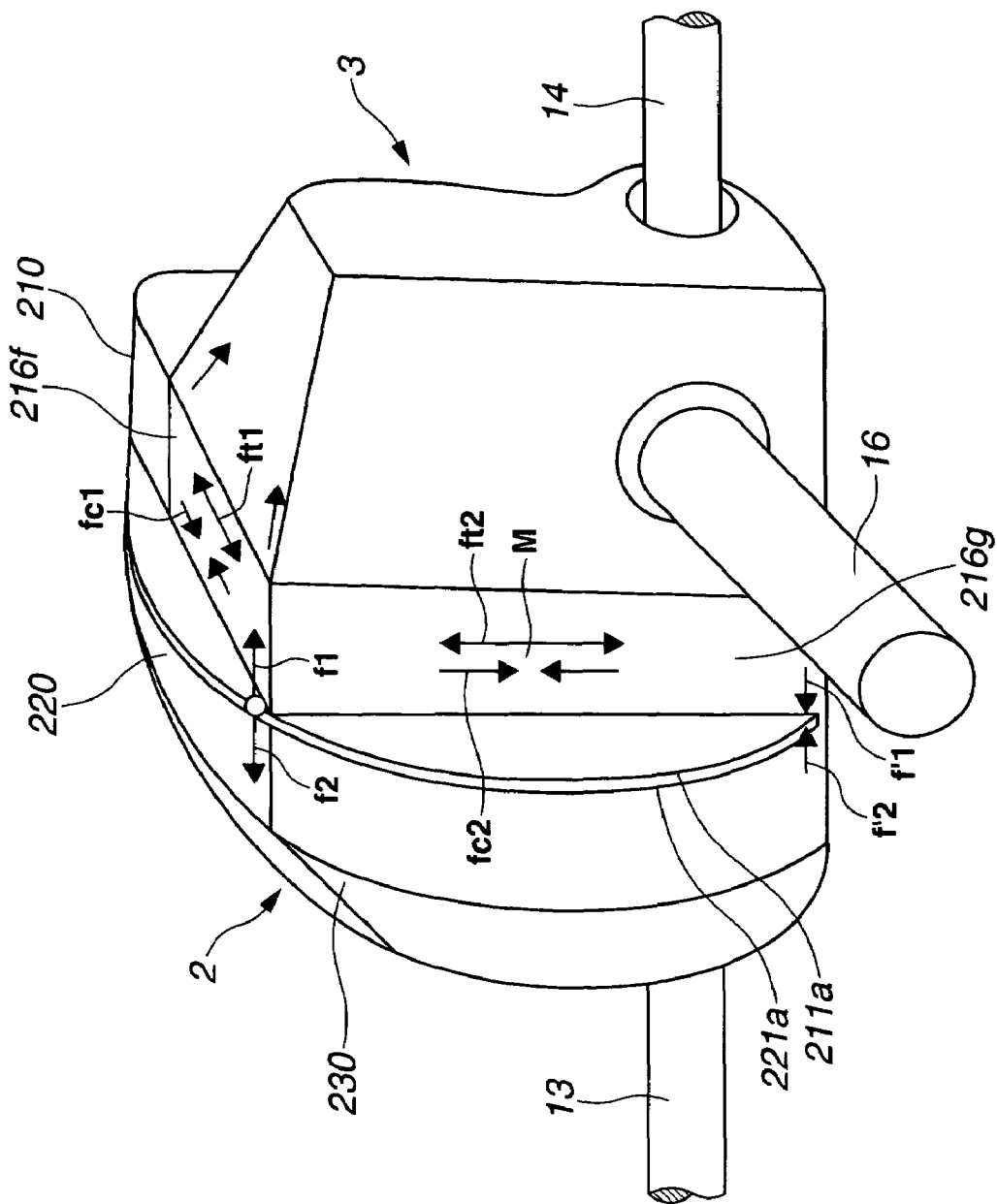
FIG. 9 is a schematic view for schematically illustrating forces acting in the transmission housing of FIG. 1.

FIG. 9 schematically shows forces acting on the transmission housing, especially on converter housing member 210, by arrows. The flange joint surface 211a of converter housing member 210 and flange joint surface 221a of first housing member 220 are united in a flange joint.

Flange joint surface 211a of converter housing member 210 is coated with a sealant for preventing oil in transmission housing 200 from leaking out of the transmission housing. Among solvent type liquid sealing material and anaerobic sealing material, this example employs the latter, i.e., the anaerobic sealing material.

Converter housing member 210 receives load due to reaction forces of torques inputted to transfer 3 from rotating shafts 14 and 16, and the weight of transfer 3. Due to this load, tensile stress ft1 and compression stress fc1 are applied, in the front and rear direction along propeller shaft 16, to converter housing member 210. Similarly, tensile stress ft2 and compression stress fc2 act in the vertical direction.

As shown in FIGS. 5 and 6, the reinforcing ribs 216f and 216g form an angled wall shaped like an inverted letter L so as to surround the drive shaft hole 215 and radial ribs 216a~216e. Horizontal reinforcing rib 216f is formed so as to maximize the length in the direction of stresses ft1 and fc1 along propeller shaft 16. Similarly, vertical reinforcing rib 216g is formed so as to maximize the length in the vertical direction of stresses ft2 and fc2. Therefore, reinforcing ribs 216f and 216g increase the rigidity of converter housing member 210 against these stresses ft and fc.

As shown in FIG. 5, each of reinforcing ribs 216f and 216g of this example extends in the widthwise direction almost over the entire width of converter housing member 210, and has a sufficient width in the lateral direction along front wheel drive shafts 4 and 5. The rear end of horizontal reinforcing rib 216f is connected integrally with the boss portion of bolt hole 217f whereas the front end of horizontal reinforcing rib 216f is connected integrally with flange 212. The upper end of vertical reinforcing rib 216g is connected integrally with the boss portion of bolt hole 217f, and the lower end of vertical reinforcing rib 216g is connected integrally with the boss portion of bolt hole 217c. Therefore, the rigidity of each reinforcing rib 216f and 216g is increased.

The reinforcing ribs 216f and 216g increase the rigidity of converter housing member 210. As a result, a moment of force is produced in vertical reinforcing rib 216g, in the clockwise direction around a center M as shown in FIG. 9. Therefore, the upper end of vertical reinforcing rib 216g receives a force f1 pulling the converter housing member 210 in the rightward direction along right front wheel drive shaft 14. The lower end of rib 216g receives a force f'1 pushing converter housing member 210 in the leftward direction along left front wheel drive shaft 13. Simultaneously, a reaction force f2 acts as a result of force f1, and a reaction force f'2 acts as a result of force f'1, as shown in FIG. 9.

Vertical reinforcing rib 216g is provided so as to maximize its length as measured in the vertical direction. Therefore, the magnitude of force f1 acting at the upper end of rib 216g is minimized, as compared to other arrangements in which the vertical length is smaller.

The rightward pulling force f1 and the leftward reaction force f2 act at the portion at which horizontal and vertical reinforcing ribs 216f and 216g intersect each other, so as to detach the flanges 211 and 221 from each other. Therefore, at the intersection portion, a crevice might be formed between the confronting joint surfaces 211a and 221a and the sealant layer might be broken.

In general, the area of a flange joint surface is determined by specifications so as to ensure a sufficient strength of the sealant. If, however, a crevice grows between the joint surfaces, the anaerobic sealant may be broken successively like a chain reaction toward the inside of transmission housing 200 until the inside is connected with the outside of transmission housing 200, and the oil leaks to the outside.

To prevent such breakage of the sealant, the groove 218 is formed in the flange joint surface 211a on the transmission housing's side or left side of the rib connecting portion at which the horizontal and vertical reinforcing ribs 216f and 216g intersect each other, as shown in FIGS. 7 and 8.

As shown in FIGS. 7 and 8, no groove is formed in the joint surface regions of the adjacent boss portions of bolt holes 217g and 217h. The width l2 of the outer and inner joint surface regions on both sides of groove 218 is set equal to l1 or slightly greater than l1. Therefore, there remains a sufficient overlap width for application of the sealant. In other words, the width and length of groove 218 are so determined as to ensure a sufficient or requisite minimum joint area for the application of sealant between the adjacent boss portions.

Figure 10:
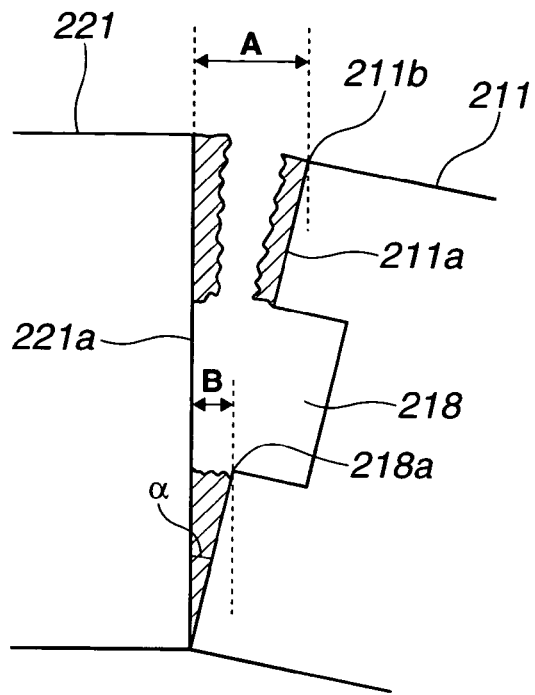
FIG. 10 is a cross sectional view of a flange joint portion for illustrating the effect of the groove shown in FIG. 7.
Figure 11:
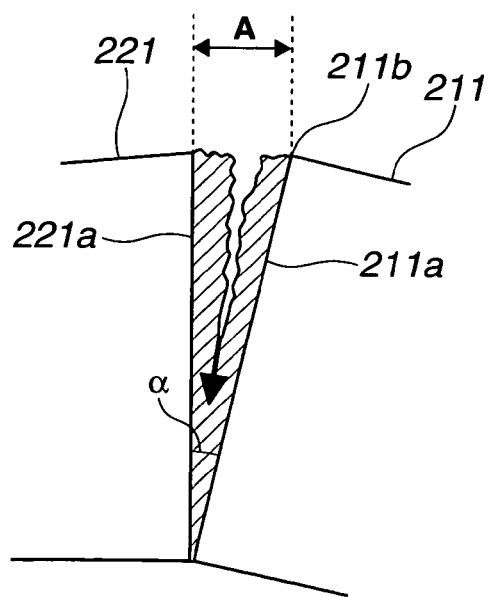
FIG. 11 is a cross sectional view of a flange joint portion in a comparative example for illustrating the effect of the groove shown in FIG. 7.

FIG. 10 schematically illustrates the sealant which is partly broken by a crevice formed by the forces f1 and f2. However, groove 218 functions to prevent the development of crevice beyond groove 218. FIG. 11 schematically illustrates the growth of a crevice in the sealant in the case in which a groove is not formed. Because of the nonexistence of groove 218, the sealant is in progress to complete breakage in the case of FIG. 11. FIGS. 10 and 11 are both sectional views viewed as if cut by a plane to which the straight line connecting the centers of bolt holes 217g and 217h is perpendicular. In these figure, the upper side is the outside of transmission housing 200, and the lower side is the inside of transmission housing 200. The region of the sealant is shown by hatching.

In FIGS. 10 and 11, the outer (or upper) end 211b of flange joint surface 211a is separated from the confronting joint surface 221a by a distance A. In FIG. 10, a distance B is measured between the inner (or lower) end of groove 218 and the confronting joint surface 221a. The sealant breaks when the width of a crevice exceeds a limit value C.

The distance A is greater than distance B, as shown in FIG. 10, the limit value C is a constant. In the outer joint surface region on the outer (upper) side of groove 218, the distance or separation A is greater than C, and hence the sealant splits in two. In the inner joint surface region on the inner (lower) side of groove 218, the seal is not yet broken, and the distance B remains smaller than the limit value C.

Therefore, even if the distance or separation A is increased beyond the limit value C by the formation of a crevice in the sealant, the groove 218 blocks the growth of the crevice, and protects the sealant on the lower side unbroken as along as the separation B remains smaller than the limit value C. Therefore, the sealant between the inner joint surface region and the confronting joint surface 221a remains unbroken and prevents leakage of oil.

If the separation B becomes greater than C, the sealant on the inner (or lower) side is broken and there is formed such a through passage completely through the joint between flanges 211 and 221 as to allow leakage of oil.

In the comparative example of FIG. 11, on the other hand, a crevice is formed in the sealant when the separation A exceeds the limit value C, and the crevice readily extends continuously to the inner side so as to form a complete through passage allowing leakage of oil.

Thus, the interposition of groove 218 increase the limit value of an angle α formed between the confronting joint surfaces 211b and 221a to cause rupture of the sealant layer. Therefore, the joint portion formed with groove 218 between the flanges can withstand the forces f1 and f2 well, and prevent leakage of oil reliably.

Forces f1 and f2 act in directions to separate the joint surfaces most influentially in the region at or near the middle between the bolt holes 217g and 217h shown in FIGS. 3, 4, 6 and 7. The boss portions of bolt holes 217g and 217h are joined securely by the respective bolts, so that a separation is unlikely to occur. The distance between bolt holes 217g and 217h is determined within a predetermined range by standards.

Groove 218 is formed at the middle between the adjacent bolt holes 217g and 217h, and extends on a straight line connecting the centers of bolt holes 217g and 217h. Between hole 217g and groove 218, there is formed a plain region in which groove 218 is not formed. Between hole 217h and groove 218, there is formed a plain region in which groove 218 is not formed. In the grooved region in which groove 218 is formed, the separation B does not become greater than the limit value C by the action of groove 218. In the plain regions in which groove 218 is not formed, the separation A does not become greater than the limit value C by the clamping forces of the bolts.

The length and width of groove 218 are set within a range to prevent breakage of the sealant, and at the same time within a range to ensure a requisite minimum area to which the sealant is applied. The length and width of groove 218 are set at values to harmonize the requirement for application of the sealant and the requirement for prevention of sealant breakage.

According to the illustrated embodiment, first and second reinforcing ribs (216g, 216f) are formed between the first side joint surface on the transfer's (right) side and the second side joint surface on the transmission housing's (left) side of converter housing member 210. A rib connecting portion (the boss portion of bolt hole 217f) is formed so that the rib connecting portion extends from a right end to a left end which is in contact with the inner circumference of the flange 211 on the left side. The right end of the rib connecting portion has a joint surface which, as a part of the first side joint surface, is flush with the joint surface 212a. Bolt hole 217f opens in the joint surface at the right end of the rib connecting portion. From the rib connecting portion, the first reinforcing rib 216g extends downwards at the side of drive shaft hole 215, and the second reinforcing rib extends horizontally over drive shaft hole 215.

Therefore, the transmission housing according this embodiment can improve the rigidity of converter housing member 210 against stresses applied from the transfer, without changing the construction of converter housing member 210 largely. As a result, the transmission housing can avoid harmful effects caused by deformation of the converter housing member, such as deterioration of gear engagement, generation of heat and noise, eccentric abrasion of shaft bearings and deterioration of torque transmission due to friction loss.

The first (or vertical) reinforcing rib (216g) extends from the first (or upper) end connected with the rib connecting portion, to the second (or lower) end connected with the transfer mount portion (or the boss portion of bolt hole 217c); and the second (or horizontal) reinforcing rib (216f) extends from the first (or rear) end connected with the rib connecting portion (or the boss portion of bolt hole 217c), to the second (or front) end connected with the flange (212) of the engine mount portion.

Therefore, both ends of each reinforcing rib is supported firmly, and the rigidity of the rib per se is increased. Therefore, the transmission housing according to this embodiment can improve the rigidity of converter housing member 210 against stresses applied from the transfer, without changing the construction of converter housing member 210 largely. As a result, the transmission housing can avoid harmful effects caused by deformation of the converter housing member, such as deterioration of gear engagement, generation of heat and noise, eccentric abrasion of shaft bearings and deterioration of torque transmission due to friction loss.

The flange (211) of the transmission housing mount portion includes a connecting flange portion which extends between first and second bolt holes (217g, 217h), and which is formed with a groove (218) depressed from the joint surface (211a) of the flange, along a line connecting the first and second bolt holes between which the rib connecting portion is located.

This groove (218) is effective to prevent deterioration of the sealing performance around the rib connecting portion at which the reinforcing ribs are connected. Therefore, the joint portion formed with groove between the flanges is resistant to rupture of the sealant between the confronting joint surfaces, and to leakage of oil.

Various variations and modifications of the illustrated embodiment are possible within the purview of the present invention. For example, instead of the groove 218 formed in the joint surface 211a of flange 211 of converter housing member 210, it is possible to form a similar groove in the joint surface 221a of flange 221 of first housing member 220 at a corresponding position acted upon by the forces f1 and f2. In this case, too, the groove formed in first housing 210 can provide the same effect of preventing breakage of a sealant layer as the groove 218 formed in converter housing member 210.

In the example shown in FIG. 10, the sealant is applied to both of the outer joint surface region on the outer side of groove 218 and the inner joint surface region on the inner side of groove 218. However, it is optional to apply the sealant only to the inner joint surface region. In this case, too, the joint structure can prevent breakage of the sealant layer as in the illustrated example.

This application is based on a prior Japanese Patent Application No. 2005-299857 filed in Japan on Oct. 14, 2005. The entire contents of this Japanese Patent Application No. 2005-299857 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A transmission housing for a four wheel drive system, comprising:
    a transmission housing member to enclose a transmission mechanism;
    a transfer housing member to enclose a transfer to apportion a driving torque from the transmission mechanism between front wheel's side and rear wheel's side; and
    a converter housing member to enclose a torque converter to be connected between an engine and the transmission mechanism, the converter housing member including:
        an engine mount portion on a first side of the converter housing member, the engine mount portion being formed integrally in the converter housing member;
        a transfer mount portion defining a first side joint surface on the first side, the transfer mount portion being formed integrally in the converter housing member, the transfer housing member being joined to the first side joint surface of the transfer mount portion;
        a transmission housing mount portion including a flange and defining a second side joint surface on a second side of the converter housing member opposite to the first side, the transmission housing mount portion being formed integrally in the converter housing member, the transmission housing member being joined to the flange of the transmission housing mount portion; and
        first and second reinforcing ribs formed between the first side joint surface and the second side joint surface;
    wherein
        the first reinforcing rib extends in a vertically extending first direction, from a rib connecting portion formed at a position contacting with an inner circumference of the flange of the transmission housing mount portion;
        the second reinforcing rib extends in a horizontally extending second direction from the rib connecting portion; and
        the first and second reinforcing ribs are provided so as to surround a drive shaft to transmit driving power from the transmission mechanism to the transfer.

2. The transmission housing as claimed in claim 1, wherein the first reinforcing rib extends in the first direction from a first end connected with the rib connecting portion, to a second end connected with the transfer mount portion; and
    the second reinforcing rib extends in the second direction from a first end connected with the rib connecting portion, to a second end connected with a flange of the engine mount portion.

3. The transmission housing as claimed in claim 1, wherein the flange of the transmission housing mount portion includes a flange portion which extends between first and second bolt holes, which is connected with the rib connecting portion, and which is formed with a groove depressed from the second side joint surface along a line connecting the first and second bolt holes.

4. The transmission housing as claimed in claim 2, wherein the flange of the transmission housing mount portion includes a flange portion which extends between first and second bolt holes, which is connected with the rib connecting portion, and which is formed with a groove depressed from the second side joint surface along a line connecting the first and second bolt holes.

5. The transmission housing as claimed in claim 2, wherein the converter housing member comprises a drive shaft boss portion which is formed with a shaft hole to receive the drive shaft and which is located between the first reinforcing rib and a flange of the engine mount portion;
the transfer mount portion includes a lower mount portion including a lower boss portion which is formed with a bolt hole, and which is connected with the second end of the first reinforcing rib; and
the drive shaft boss portion is located between the lower mount portion of the transfer mount portion and the second reinforcing rib.

6. The transmission housing as claimed in claim 5, wherein the rib connecting portion includes an upper boss portion defining the first side joint surface and including a bolt hole opening in the first side joint surface, and the first reinforcing rib extending from the upper boss portion connected with the flange of the transmission housing mount portion, to the lower boss portion connected with the flange of the transmission housing mount portion.

7. The transmission housing as claimed in claim 5, wherein the transfer mount portion of the converter housing member includes an upper mount portion which includes a plurality of boss portions each formed with a bolt hole, and which extends between the second reinforcing flange and the drive shaft boss portion, from the flange of the engine mount portion toward the first reinforcing rib.

8. The transmission housing as claimed in claim 7, wherein the lower mount portion and the upper mount portion of the transfer mount portion are both connected with the flange of the engine mount portion so as to form the first side joint surface continuously extending from the transfer mount portion to the engine mount portion.

9. The transmission housing as claimed in claim 5, wherein the flange of the transmission housing mount portion include a first boss portion formed with a first bolt hole, a second boss portion formed with a second bolt hole, and a connecting flange portion which extends between the first and second boss portions, which is connected with the rib connecting portion, and which includes an outer joint surface region joined with a joint surface of a flange of the transmission housing member, an inner joint surface region joined with the joint surface of the flange of the transmission housing member, a non-joint region which extends between the first boss portion and the second boss portion of the flange of the transmission housing mount portion of the converter housing member, and which is not joined with the joint surface of the flange of the transmission housing member.

10. The transmission housing as claimed in claim 9, wherein the non-joint region is defined by a groove formed in at least one of the connecting flange portion and the flange of the transmission housing member.

11. The transmission housing as claimed in claim 5, wherein:
the converter housing member further includes a depression to receive the torque converter, and a center hole to receive a shaft extending from the torque converter to the transmission mechanism;
an axis of the shaft hole of the drive shaft boss portion is parallel to an axis of the center hole and perpendicular to the first side joint surface and the second side joint surface of the converter housing member; and
each of the first and second reinforcing fibs has a width extending along the axis of the shaft hole of the drive shaft boss portion, between the first side joint surface and the second side joint surface.

12. The transmission housing as claimed in claim 11, wherein the transfer housing member includes a propeller shaft hole to receive a propeller shaft to transmit a driving torque to the rear wheel's side, and the second reinforcing fib extends from the first end to the second end along an axis of the propeller shaft.

13. The transmission housing as claimed in claim 5, wherein the first reinforcing rib is longer than the second reinforcing rib.

14. The transmission housing as claimed in claim 1, wherein the transmission housing member enclosing the transmission mechanism includes a flange, the converter housing member includes the transmission housing mount portion including the flange which is joined with the flange of the transmission housing member, and the converter housing member includes the rib connecting portion extending from a first end defining the first side joint surface joined with the transfer housing member, to a second end integrally connected with the flange of the transmission mount portion of the converter housing member.

15. The transmission housing as claimed in claim 14, wherein;
the converter housing member comprises a drive shaft boss portion which is formed with a shaft hole to receive a drive shaft and which is located between the first reinforcing rib and a flange of the engine mount portion;
the flange of the transmission housing mount portion of the converter housing member includes an upper portion formed with a bolt hole receiving a bolt for joining the transmission housing member and the converter housing member together, and a side portion formed with a bolt hole receiving a bolt for joining the transmission housing member and the converter housing member together;
the first reinforcing rib extends the vertically extending first direction between the side portion of the flange of the transmission housing mount portion and the shaft hole; and
the second reinforcing rib extends the horizontally extending second direction between the upper portion of the flange of the transmission housing mount portion and the shaft hole.

16. The transmission housing as claimed in claim 14, wherein the transmission housing member encloses the transmission mechanism which includes a differential gear unit connected with first and second front wheel drive shafts for driving front wheels of a vehicle, the transmission housing member includes a hole to receive the first front wheel drive shaft, the converter housing member includes a drive shaft boss portion which is formed with a shaft hole to receive the second front wheel drive shaft and a rear drive shaft for driving rear wheels of the vehicle, and which is located between the first reinforcing rib and a flange of the engine mount portion, and the transfer housing member includes a hole to receive the second front wheel drive shaft, and a hole to receive a propeller shaft drivingly connected with the rear drive shaft.

17. The transmission housing as claimed in claim 1, wherein each of the first and second reinforce ribs is in the form of a plate having a width extending between the first and second joint surfaces and almost equaling a distance between the first and second joint surfaces.

18. The transmission housing as claimed in claim 3, wherein the transmission housing mount portion of the converter housing member includes the flange defining the second side joint surface to which the transmission housing member is joined, the flange of the transmission housing mount portion includes the flange portion which includes first and second flat regions each of which extends between the first and second bolt holes, and the groove depressed from the second side joint surface, the groove extending along the line connecting the first and second bolt holes between the first and second flat regions.

19. A transmission assembly comprising:
   a torque converter to be connected with an engine;
   a transmission mechanism connected with the torque converter;
   a transfer to apportion a driving power from the transmission mechanism between a front wheel drive axle and a rear wheel driving propeller shaft, the transfer being connected with the transmission mechanism by a drive shaft; and
   a transmission housing comprising:
      a transmission housing member enclosing the transmission mechanism, and including a flange; and
      a converter housing member which encloses the torque converter and which is joined between the transfer on a first lateral side and the transmission housing member on a second lateral side, the converter housing member including:
         an engine mount flange to which the engine is joined on the first lateral side;
         a transfer mount portion defining a first side joint surface to which the transfer is joined on the first lateral side;
         a transmission housing mount flange defining a second side joint surface to which the flange of the transmission housing member is joined on the second lateral side;
         a shaft boss portion formed with a shaft hole receiving the drive shaft;
         a horizontal reinforcing rib which is formed between the first side joint surface and the second side joint surface, and which extends along the propeller shaft above the shaft hole, from a rib connecting portion; and
         a vertical reinforcing rib which is formed between the first side joint surface and the second side joint surface, which extends downwards from the rib connecting portion, and which is located at such a position that the shaft hole is located between the vertical reinforcing rib and the engine mount flange.

20. A transmission assembly comprising:
   a torque converter to be connected with an engine;
   a transmission mechanism connected with the torque converter;
   a transfer to apportion a driving power from the transmission mechanism between a front wheel drive axle and a rear wheel driving propeller shaft, the transfer being connected with the transmission mechanism by a drive shaft; and
   a transmission housing comprising:
      a transmission housing member enclosing the transmission mechanism, and including a flange; and
      a converter housing member which encloses the torque converter and which is joined between the transfer on a first lateral side and the transmission housing member on a second lateral side, the converter housing member including:
         an engine mount flange to which the engine is joined on the first lateral side, the engine mount flange being formed integrally in the converter housing member;
         a transfer mount portion defining a first side joint surface to which the transfer is joined on the first lateral side, the transfer mount portion being formed integrally in the converter housing member, a portion of a transfer housing that encloses the transfer being joined to the first side joint surface of the transfer mount portion;
         a transmission housing mount flange defining a second side joint surface to which the flange of the transmission housing member is joined on the second lateral side, the transmission housing mount flange being formed integrally in the converter housing member, a portion of a transmission housing that encloses the transmission mechanism being joined to the transmission housing mount flange;
         a shaft boss portion formed with a shaft hole receiving the drive shaft;
         a horizontal reinforcing rib which is formed between the first side joint surface and the second side joint surface, and which extends along the propeller shaft above the shaft hole, from a rib connecting portion; and
         a vertical reinforcing rib which is formed between the first side joint surface and the second side joint surface, which extends downwards from the rib connecting portion, and which is located at such a position that the shaft hole is located between the vertical reinforcing rib and the engine mount flange.

* * * * *